April 12, 1938.                    W. ARKLEY                       2,113,974
                    SPEED CONTROLLING MECHANISM FOR VEHICLES
                         Filed June 17, 1935          3 Sheets-Sheet 3
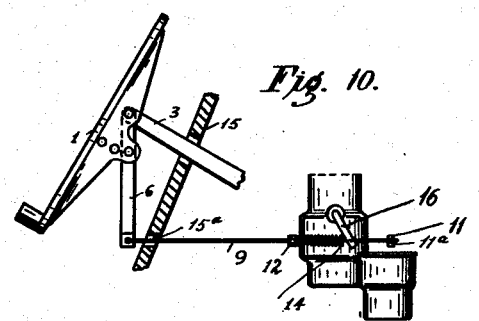
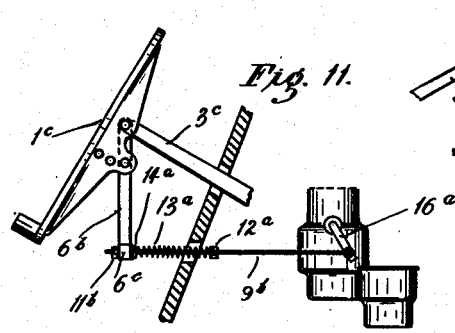
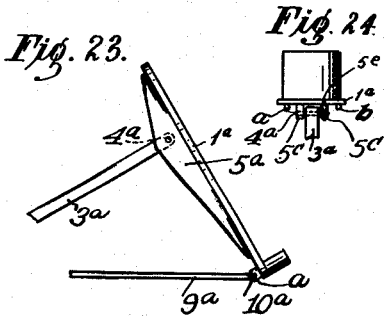
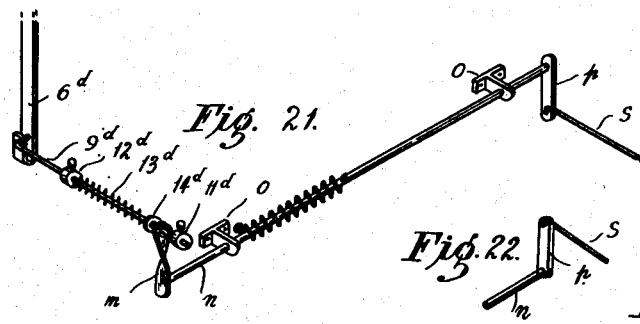

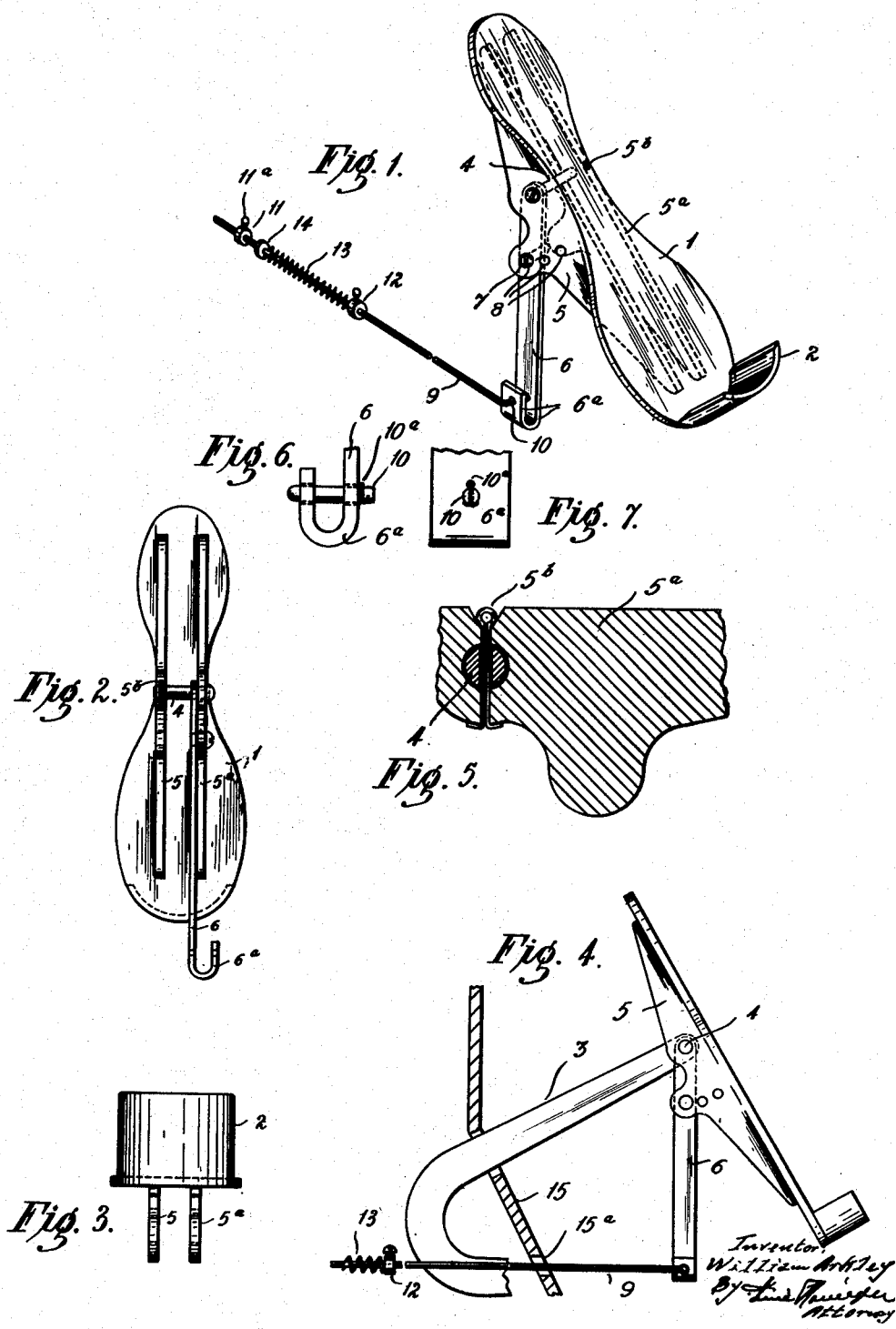

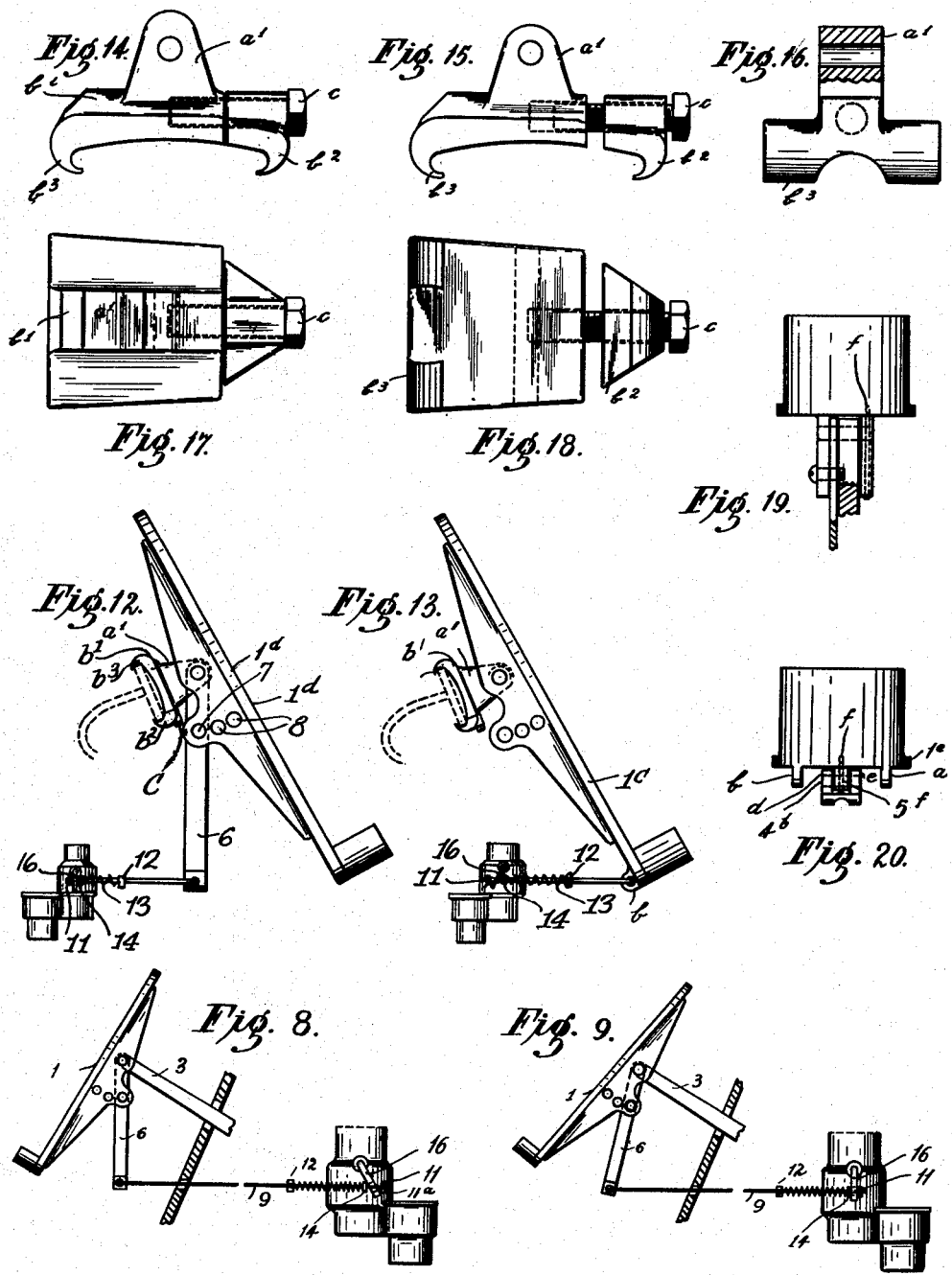

Patented Apr. 12, 1938

2,113,974

UNITED STATES PATENT OFFICE 2,113,974

SPEED CONTROLLING MECHANISM FOR VEHICLES

William Arkley, Surrey Hills, Victoria, Australia

Application June 17, 1935, Serial No. 27,110
In Australia June 21, 1934

7 Claims. (Cl. 192—3)

In the driving of vehicles having separate pedals to operate the braking mechanism and the throttle there is, in an emergency, always the possibility that the driver will press on the throttle pedal instead of raising his foot therefrom to apply the brakes; also time is taken to remove the foot from one pedal to another and this time may be an important factor in the avoidance or otherwise of a collision.

Controlling mechanisms have been devised with the object of providing a single pedal actuation of the brakes and throttle lever but these are intricate in the arrangement of levers and/or they demand an unnatural movement of the foot of the driver in either the application of the brakes or the operation of the throttle, for example, in one construction the throttle is operated by a rotary or lateral movement of the foot whilst another known construction demands the exertion of pressure by the heel of the foot alone to apply the brakes and a full forward thrust of the foot will not move the pedal; yet another mechanism requires the exertion of pressure by the heel to open the throttle.

The natural inclination built on long use or understanding of a driver of a vehicle is to actuate the throttle pedal or button by a forward rocking movement of the foot in a vertical plane and to apply the brakes by a full forward thrust of the foot.

The object of this invention is to provide a mechanism which will enable the operation of the brakes and the throttle of a vehicle by a natural movement of the foot on a single pedal.

A further object of the invention is to provide a mechanism of the type above mentioned, which is adjustable as to the angle of inclination of its normal resting position.

Fig. 1 is a view in part section showing the parts of the mechanism unmounted.

Fig. 2 is a plan view of the lower surface of the pedal with an offset arm mounted.

Fig. 3 is a view of the back of the pedal showing the webs formed thereon.

Fig. 4 is a view of the pedal mounted on the end of the foot controlled brake lever.

Fig. 5 is an enlarged view in section of a split pin passing through one of the webs on the pedal and through the spindle on which it pivots.

Fig. 6 is an enlarged view of a recurved portion of the arm offset from the pedal.

Fig. 7 is a side elevation of the part shown in Fig. 6.

Fig. 8 is a view in part section showing the pedal connected to the throttle lever of a carburetor through the floor board of a vehicle and with the pedal in normal position.

Fig. 9 is a view of the mechanism shown in Fig. 8 but with the pedal tipped forwardly to actuate the accelerator rod to open the throttle.

Fig. 10 is a view in part section showing the position of the parts when pressure is exerted to apply the brakes.

Fig. 11 shows a modified form of the arrangement of parts.

Fig. 12 illustrates a modified form of mounting the pedal on the foot controlled brake lever.

Fig. 13 illustrates a modification.

Fig. 14 is a view of a claw clamp on which the pedal is mounted and which is clamped to an existing brake pedal.

Fig. 15 is a view showing how the clamp illustrated in Fig. 14 is extensible.

Fig. 16 is an end view in part section of the clamp.

Fig. 17 is a plan from above the clamp.

Fig. 18 is a plan from beneath the clamp.

Fig. 19 is an end view of the pedal mounted on a single extension from the clamp.

Fig. 20 is an end view of the pedal with a single web formed thereon, which is mounted between two extensions from a bracket as in Fig. 14.

Fig. 21 is a view showing how the offset arm from the pedal is connected to a rock shaft which is connected to a downwardly extending lever on the other side of the engine.

Fig. 22 is a view showing the rock shaft end connected to an upwardly extending lever.

Figs. 23 and 24 illustrate a further modification.

Referring to Figs. 1, 2, 5 and 6 a pedal 1, substantially in the shape of the sole of a shoe, has a heel rest 2 extending upwardly from the lower end thereof; the said pedal 1 has a spindle 4 passing through orifices in webs 5, 5a, formed on and running parallel along the under surface of the said pedal but being spaced apart. The spindle 4 is held in position by means of a split pin 5b passing through the pedal 1 and through the web 5a. An arm 6 is mounted on the spindle 4, this being effected by passing the said spindle through an orifice in the said arm which is held fixed at an angle to the pedal by a set screw 7 being inserted into it through one of a series of holes 8 in the side of the web 5—the series being provided to enable the adjustment of the angle of inclination of the pedal to the arm which, in use, is usually vertical.

The lower end of the arm 6 is recurved to facilitate a stable connection thereto of a bent end 10 of an accelerator rod 9 the said bent end 10 passing through holes in the arm 6 and the recurved portion 6a thereof, and being held in loose connection by means of a split pin 10a passing through the end of the portion 10.

The rod 9 carries collars 11 and 12 which are adjustable as to position and between these two collars a spiral spring 13 and a washer 14 are mounted on the rod, the washer being at the end of the spring nearer the collar 11.

Referring now to Figs. 1, 4, 5, 9 and 10 and the mounting of the device on a vehicle—a hole is made in the end of the foot operated brake lever 3 and the spindle 4 is passed through the web 5, the arm 6, the brake lever 3 and the web 5a, and the pin 5b is then inserted to hold the parts in assembly.

The rod 9 passes through a hole 15a in the floor board 15 of a vehicle and, the collar 11 having been temporarily removed, is passed through an eyelet provided in the throttle lever 16 whereupon the collar 11 is replaced; thus the lever 16 is mounted on the rod 9 disposed between the collar 11 and the washer 14 but, as the collar 11 is fastened to the rod 9 by the tightening of the set screw 11a, the rod is free to move through the eyelet in the lever 16 in one direction only and that movement is against the action of the spring 13 which is confined between the washer 14 and the collar 12.

It may be well to mention at this stage that in the construction illustrated, except that in Fig. 21, the operation of opening the throttle is performed by a backward pull on the throttle lever.

In operation a tilting or rocking of the pedal 1 forwardly in a vertical plane about the spindle 4 as illustrated in Fig. 9 causes the lower end of the arm 6 to describe an arc backwardly. The arm 6 carries with it the rod 9 which is unable to pass through the eyelet in the throttle lever 16 because of the collar 11 and consequently draws the said lever backwardly to open the throttle. When it is desired to close the throttle completely or to a degree, the pedal 1 is tipped backwardly so that the lower end of the arm 6 moves forward and pushes the accelerator rod 9 forward causing it to tend to pass through the eyelet in the throttle lever 16; however as the spring 13 bears directly on the washer 14 juxtaposed to the said lever 16 and as this spring tends to become compressed as the collar 11 tends to move away from the lever 16 the reaction thereof causes the lever 16 to follow the collar 11 to its new position.

The above described operation is performed without movement of the foot operated brake lever 3 but when the pressure of the whole foot of the driver is exerted on the pedal 1 the said brake lever is pushed forward as illustrated in Fig. 10 to effect the application of the brakes, and further, the arm 6 and consequently the rod 9 are moved forwardly.

As the rod 9 carries the collar 11 forwardly pressure is released from behind the lever 16 and the reaction of the spring 13 causes the said lever to follow the collar 11 until the throttle is closed and the lever is at rest the forward movement of the rod 9 is, however, greater in this instance than when it is merely necessary to close the throttle without application of the brakes and consequently the collar 11 passes beyond the lever 16 thus causing the compression of the spring 13 the reaction of which holds the throttle lever firmly in position. Upon releasing the pressure of the whole foot on the pedal 1 the rod 9 resumes its position with the collar 11 immediately behind the throttle lever 16.

In a modified form of the invention as illustrated in Figs. 23 and 24 a pedal 1a is pivotally mounted on the end of the foot controlled brake lever 3a by means of a spindle 4a passing through orifices in webs 5c formed on the said pedal and also through an orifice in the foot controlled brake lever 3a. The pedal 1a is fixed to the spindle 4a by means of a split pin 5e passing through the web 5c and through the spindle. Small webs a and b are formed on the pedal 1a at or near the heel thereof and projecting from the under surface. Holes in the webs a and b are situated diametrically opposite and receive the bent end 10a of an accelerator rod 9a (not shown in Fig. 24) which is held therein by means of a split pin. The operation of this modified form of the invention is similar to that described previously save that the accelerator rod 9a is actuated directly by the pedal 1a instead of indirectly through the arm or lever 6.

The modified form of construction as illustrated in Fig. 23 may also be mounted as shown in Fig. 13 on an arm a' projecting from a bracket b' constructed in the form illustrated in Figs. 14, 15, 16, 17 and 18.

In a further modification as illustrated in Fig. 11 an arm 6b is offset from a pedal 1c mounted on the foot controlled brake lever 3c in the manner previously described. At the lower end of the said arm or lever 6b an eyelet 6c is formed therein and this eyelet receives an accelerator rod 9b passing therethrough. A collar 11b on the said rod 9b is positioned behind the eyelet in the arm 6b, that is, on the side nearer the rear of the vehicle; and on the rod in front of the said arm is a spring 13a confined between a washer 14a, juxtaposed to the said arm, and a collar 12a on the rod 9b which at its other end, is fixed to a throttle lever 16a adapted to actuate the throttle to open it by a backward pull.

In the operation of this modified form of the invention the tipping of the pedal 1c about its spindle causes the arm or lever 6b to move backwardly carrying with it the collar 11b and consequently the rod 9b which draws the throttle lever 16a backwardly to open the throttle. The tipping back of the pedal 1c to or towards its normal position, that is, its position of rest, will cause a forward movement of the arm 6b which tends to compress the spring 13a which, however, in order to retain its natural position, forces the collar 12a forwardly so that the rod 9b moves forwardly and forces the lever 16a to close or partly close the throttle, depending upon the degree of backward tilt of the pedal 1c. When the pedal 1c is pressed forward as a whole to cause the application of the brakes, the rod 9b is moved forwardly as above described until the throttle lever 16a may move no further forward, that is, until the throttle is closed completely, whereupon the arm 6b moves along the rod 9b against the action of the spring 13a, which is compressed thereby and consequently ensures the return of the arm to its position in proximity to the collar 11b upon the release of pressure from the pedal 1c.

In a further modification of the invention as illustrated in Fig. 12 the actual construction is the same as any one of those illustrated in Figures 1, 10 or 11 but the mounting of the pedal is altered. In this modified form, the pedal 1d is mounted, in a manner similar to that described for the mounting of the pedal on the lever 3, on an arm a1 projecting from a bracket b1 constructed in the form of an adjustable claw clamp, one claw member b2 being detachable from the body and adjustable as to distance from the other claw b3 carried by the body of the clamp, by means of a screw bolt c which passes through it to lodge in the said body. This clamp is fitted to a brake pedal present on a vehicle and is fastened thereon by adjustment of the screw bolt c.

Another modified form of mounting the pedal is illustrated in Fig. 20. In this a single web 5f is formed centrally of the pedal 1e and is disposed on a spindle 4b between two bearings d and e in the form of extensions from a bracket similar to that illustrated in Fig. 14 through which said bearings the spindle also passes. In this construction the pedal is fixed to the spindle by a split pin f passing through the web 5f and through the spindle, and the width of the web is such in comparison with the distance between the two bearings d and e that the latter may not be dislodged therefrom by lateral movements of the web, that is to say, if the accelerator rod is attached directly to the lower end of the pedal by means of it being bent and the bent end being passed through and held in orifices in small webs a and b formed on the under side of the pedal near the heel thereof, the spaces left between the sides of the web and the bearing when added is not as great as the width of one of the said bearings and, if the accelerator rod is attached to an offset arm, then the space between the two bearings should not be so great as the widths of the web, the arm and one of the bearings, added together.

In the case of a vehicle carrying the carburetor on the off side of the engine, that is the side other than that on which the driver is seated, the mechanism is assembled as illustrated in Figures 21 and 22. The accelerator rod 9d is attached at one end to an offset arm 6d and, at the other end, is slidable through a lever m fixedly attached to a rock shaft n. A stop or collar 11d is carried by the rod 9d on the side of the lever m further from the arm 6d and is in juxtaposition to the said lever when the arm 6d is in normal position. A spring 13d is confined between a washer 14d and a collar 12d carried on the rod 9d on the side of the lever m nearer to the arm 6d.

The rock shaft n is carried in bearings o and is fixed, at its other end, to one end of a lever p into the other end of which is loosely fastened a rod s leading to the throttle lever to which it is fixed.

If the lever p extends downwardly from the rock shaft n the backward movement of the lower end of the arm 6d indirectly causes, by means of the system of levers, the forward movement of the rod s so that the throttle is opened by a forward push on the throttle lever; but if the lever p extends upwardly as in Fig. 22 the rod s is drawn back by backward movement of the lower end of the arm 6d and thus the throttle is opened by a backward pull on the throttle lever.

I claim:—

1. In a speed controlling mechanism for vehicles the combination of a pedal pivotally mounted on the end of the foot controlled brake lever by means of a spindle passing through two webs formed on the said pedal and through an orifice in the said lever end which is disposed between the two webs; an arm through which the spindle also passes and which is held in variably fixed relationship to the pedal by a set screw passing through one of a series of holes in one of the webs and into the said arm; a rod attached at one end to the arm and, at the other end, slidable through the lever which operates the throttle, which said rod carries a stop in juxtaposition to the throttle lever, when the pedal is in normal position, and on the side of the lever further from the said arm and which said rod also carries a spiral spring confined between the throttle lever and a stop on the rod on the side of the lever nearer to the said arm.

2. In a speed controlling mechanism for vehicles the combination of a pedal pivotally mounted on an extension from a clamp which is fixed to the pedal existing on the end of the foot controlled brake lever, the means of mounting being a spindle passing through two webs formed on the first mentioned pedal and through an orifice in the said extension which is disposed between the two webs; an arm through which the spindle also passes and which is held in variable fixed relationship to the pedal by a setscrew passing through one of a series of holes in one of the webs and into the said arm; a rod attached at one end to the arm and, at the other end, slidable through the lever which operates the throttle, which said rod carries a stop in juxtaposition to the throttle lever when the pedal is in normal position and on the side of the lever further from the said arm and which said rod also carries a spiral spring confined between the throttle lever and a stop on the rod on the side of the lever nearer to the said arm.

3. In a speed controlling mechanism for vehicles the combination of a pedal pivotally mounted in bearings in the form of two extensions from a clamp which clamps on the pedal existing on the end of the foot controlled brake lever, the means of mounting being by passing a spindle through the two bearings and through a web formed on the first mentioned pedal the said web being disposed on the spindle between the two bearings; an arm through which the spindle also passes and which is held in variable fixed relationship to the pedal by a setscrew passing through one of a series of holes in the said web and into the said arm; a rod attached at one end to the arm and, at the other end slidable through the lever which operates the throttle which said rod carries a stop in juxtaposition to the throttle lever when the pedal is in normal position and on the side of the lever further from the said arm; and which said rod also carries a spiral spring confined between the throttle lever and a stop on the rod on the side of the lever nearer to the said arm.

4. In a device of the character described, a foot brake-actuating lever, a brake and throttle-actuating foot pedal, means for pivotally mounting said pedal on the free end of said lever for pivotal movement about a horizontal axis, an arm pivoted at one end to said pivot means, means connecting another portion of said arm to a throttle actuating lever, and means for adjustably fixing said arm relative to said pedal so that movements of said pedal about its pivot will impart movements to said throttle lever.

5. In a device of the character described, a foot brake-actuating lever, a brake and throttle-actuating foot pedal, means for pivotally mounting said pedal on the free end of said lever for pivotal movement about a horizontal axis, an arm pivoted at one end to said pivot means, means connecting another portion of said arm to a throttle actuating lever, means for adjustably fixing said arm relative to said pedal so that movements of said pedal about its pivot will impart movements to said throttle lever, and a lost motion device associated with the means connecting said arm with the throttle lever, operable to provide for movement of said brake lever independently of said throttle lever.

6. In an automotive vehicle having a foot brake lever provided with a foot pedal and an engine-controlling throttle lever, a clamp detachably mounted on the brake and throttle-actuating foot brake pedal, a horizontal transverse pin carried by said clamp, a foot pedal pivotally mounted on said pin, an arm pivotally mounted on said pin, a link connecting another portion of said arm to said throttle lever, and means for adjustably fixing said arm relatively to said pivoted pedal so that pivotal movements of said pedal about said pin will impart movements to said throttle lever.

7. In an automotive vehicle having a foot brake lever provided with a foot pedal and an engine-controlling throttle lever, a clamp detachably mounted on the foot brake pedal, a horizontal transverse pin carried by said clamp, a brake and throttle-actuating foot pedal pivotally mounted on said pin, an arm pivotally mounted on said pin, a link connecting another portion of said arm to said throttle lever, means for adjustably fixing said arm relatively to said pivoted pedal so that pivotal movements of said pedal about said pin will impart movements to said throttle lever, and a lost-motion device associated with said link to provide for movement of said brake lever independently of said throttle lever.

WILLIAM ARKLEY.